M. L. NORRIS.
MILKING MACHINE.
APPLICATION FILED OCT. 24, 1914.

1,240,765.

Patented Sept. 18, 1917.
2 SHEETS—SHEET 1.

WITNESSES
G. R. Pierce
E. B. Marshall

INVENTOR
Marvin L. Norris
BY Munn & Co
ATTORNEYS

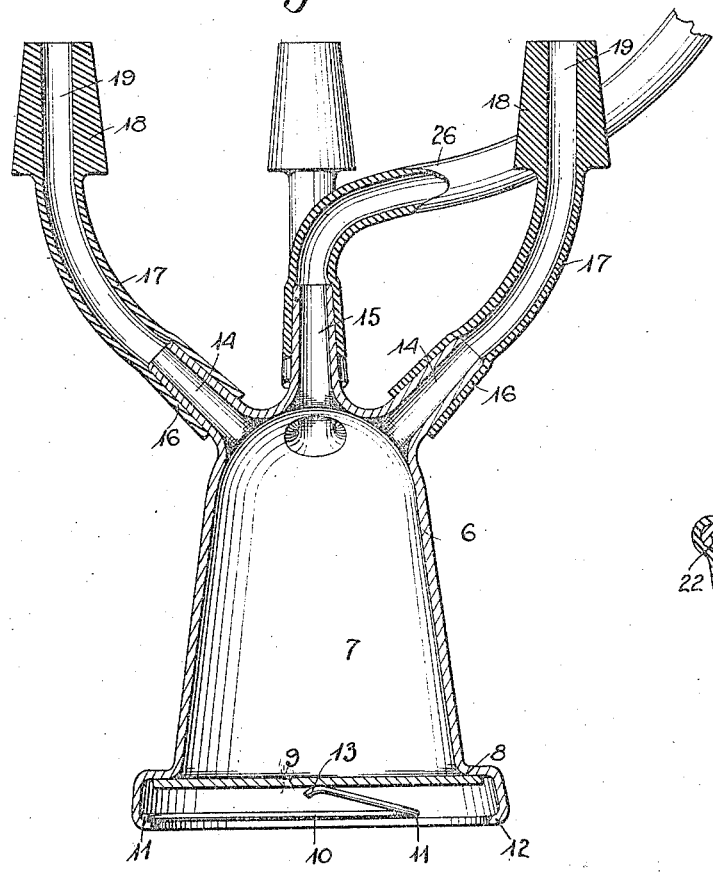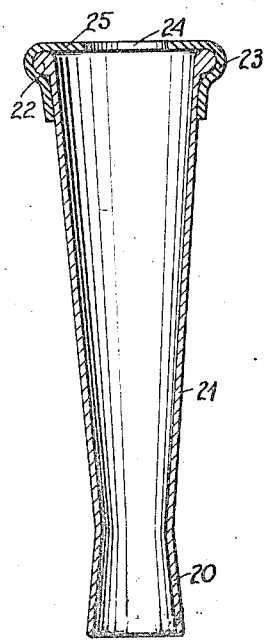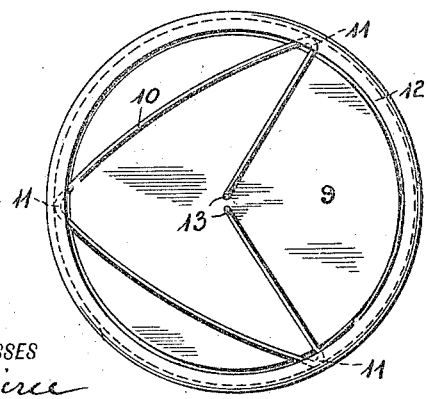

UNITED STATES PATENT OFFICE.

MARVIN L. NORRIS, OF FORT WAYNE, INDIANA.

MILKING-MACHINE.

1,240,765.   Specification of Letters Patent.   Patented Sept. 18, 1917.

Application filed October 24, 1914. Serial No. 868,416.

*To all whom it may concern:*

Be it known that I, MARVIN L. NORRIS, a citizen of the United States, and a resident of Fort Wayne, in the county of Allen and State of Indiana, have invented a new and Improved Milking-Machine, of which the following is a full, clear, and exact description.

My invention has for its object to provide a milking machine with units which are compact and which may be readily cleaned, the units being supported by the teat cups which are attached to the teats of the cow, and serving to convey milk to pails or receptacles which may be disposed under the units.

A milk chamber forms a part of each unit, each milk chamber having an opening with a valve seat in its bottom and a valve which is pressed upwardly against the valve seat by a spring for closing the opening. With this construction pressure in the milk chamber may be lowered to draw milk from the cow's udder when the pressure in the milk chamber may be increased slowly to restore the blood and the tissues in the teats to normal condition and at the same time press the valve down against the resiliency of the spring to permit the milk to flow through the opening to a pail disposed below the unit.

Additional objects of the invention will appear in the following specification in which the preferred form of my invention is disclosed.

In the drawings similar reference characters refer to similar parts in all the views in which—

Fig. 3 is a sectional view of the unit shown in Fig. 2;

Fig. 4 is an inverted plan view of the bottom of the unit showing the valve and the spring for holding the valve on its seat; and Fig. 5 is a sectional view showing one of the cups.

Figure 1:
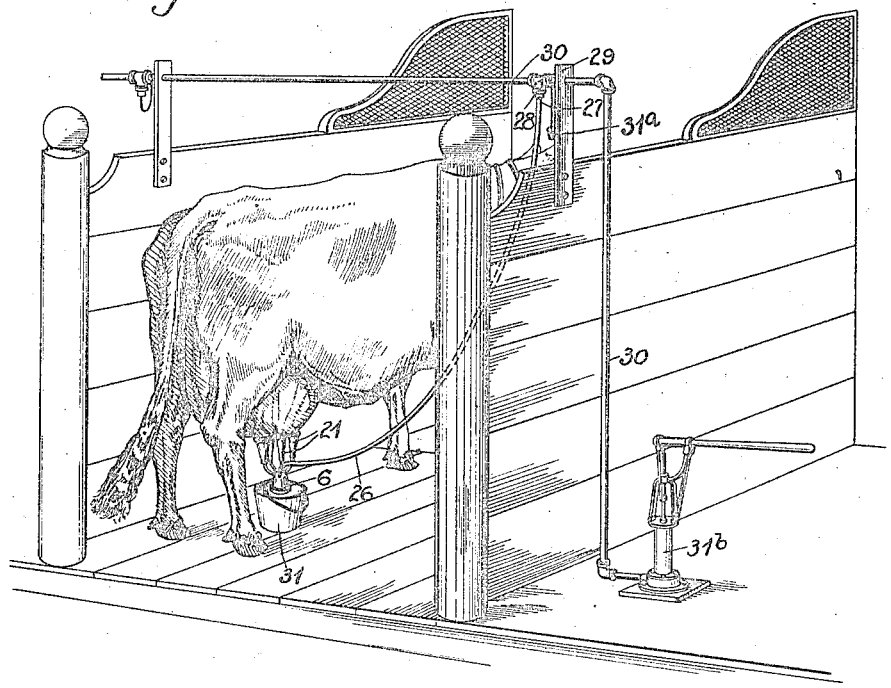
Figure 1 is a perspective view showing how my milking machine is used.
Figure 2:
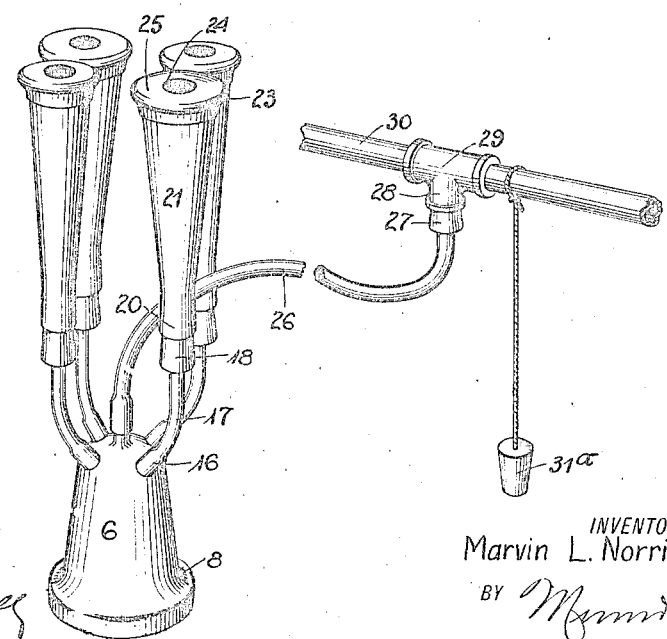
Fig. 2 is a perspective view showing one of the units and how it is attached to the pipe connected with a pump.

By referring to the drawings it will be seen that the unit 6 has a milk chamber 7, the bottom of which is open and around which there is disposed a valve seat 8 against which the valve 9 is normally disposed.

This valve 9 is held on its seat by the spring which is heart in shape and which has three elbows 11 disposed within the peripheral shoulder 12 at the bottom of the unit, the spring 10 having terminals 13 which press upwardly against the valve 9. As shown in the drawings, the unit 6 has four nipples 14 extending upwardly from the chamber 7 with which they are connected, there being also a central nipple 15 which is connected with the said chamber. The ends 16 of the tubes 17 are disposed over the nipples 14, these tubes 17 having stoppers 18 with passages 19 so that when a stopper 18 is disposed in the bottom 20 of a teat cup 21, it will make a tight fit. However, the construction is such that the stoppers 18 may be readily removed from the teat cups to permit of their being cleansed. The walls in the teat cups diverge downwardly and also diverge upwardly as best shown in Fig. 5 of the drawings, the upper end of the teat cup having a rim over which is disposed a rubber tubular member 23 with an opening 24, it being possible to draw this rubber tubular member 23 over the rim 22, so that it will resemble a diaphragm at 25 with the opening 24 in the middle. This rubber tubular member 23 may, of course, be readily removed from the teat cup 21. It will also be understood that as the walls of the teat cup diverge at both ends it may be conveniently cleansed. It will also be seen that, as the teat cup 21 may be readily removed from the stopper 18, another teat cup of another desired size may be substituted should occasion require.

When the machine is used the unit 6 is disposed beneath the cow's udder and the teat cups 21 are supported by the teats. However, before doing this, I prefer to engage a tube 26 with the nipple 15, this tube 26 having a stopper 27 which is disposed in an opening 28 in the T 29 connected with a pipe 30, which in turn, is connected with a pump 31$^b$. This pump is provided for alternately increasing and decreasing air pressure in the pipe 30. When the pump has been started the tubes 17 are permitted to fall so that there will be very little suction in the tubes until the teat cups 21 are disposed on the teats of the cow. The teat cups 21 are then disposed with the openings 24 in the tubular rubber members 23 at the ends of the cow's teats and the suction then draws the teats inside the cups, the diaphragm 25 of the rubber tubular members 23 forming approximately an air tight connection. When this has been done and the pump is worked in the manner described to decrease the pressure in the tube 30 and then increase the pressure in the said tube, the suction in the milk chamber 7 serves to draw the milk from the teats, the milk flowing into the milk chambers 7. When the pressure in the pipe 30 is gradually increased it will, as has been stated, press the valve downwardly to permit the milk to flow from the milk chamber 7 into a pail 31 disposed thereunder, the increased pressure in the milk chamber 7 also serving to increase the pressure in the teat cups which presses against the teats, thus restoring the blood and tissues in them to their normal condition.

When the stopper 27 is removed from the opening 28 in the T of the pipe 30, the stopper 31ª is used to close the opening to prevent loss of suction or pressure in pipe 30. It will be understood that the tubes 17 may be readily cleansed by a small bristle brush such as chemists use to clean small test tubes. It will also be understood that the valve 9 and the spring 10 may be removed from the unit 6 so that all parts may be thoroughly and conveniently cleansed.

Having thus described my invention I claim as new and desire to secure by Letters Patent:

1. In a milking machine, a milk chamber in one piece shaped substantially like an inverted cup, a detachable valve in one piece for closing the opening in the bottom of the milk chamber, and resilient means in one piece for engaging the milk chamber and the valve for holding the valve yieldingly in closed position.

2. In a milking machine, a pipe having an opening, a stopper for closing said opening, a tube with a stopper at one end and detachably disposed in the opening, the stopper having a passage affording communication between the pipe and the tube and being interchangeable with the first mentioned stopper, a unit having a milk chamber with an opening in its bottom and additional openings, a tube connected with one of the additional openings, a valve for closing the first mentioned opening in the milk chamber, a teat cup connected with the last mentioned tube and having free communication at all times with the milk chamber, and means connecting the first tube with another of the said additional openings.

3. In a milking machine, a portable member in a single piece and substantially like an inverted cup, with a valve seat at its bottom, a valve normally disposed against the outer side of the valve seat for closing the bottom of the member, resilient means at the outer side of the valve for pressing the valve against the valve seat, a teat cup, valveless means connecting the teat cup with the interior of the member, and stationary means for alternately increasing and decreasing the pressure in the portable member for the purpose specified.

4. In a milking machine, a pipe line having an opening, a stopper for closing said opening, another stopper interchangeable with the first mentioned stopper and having a passage, and a unit having a tube secured to the second mentioned stopper at the passage, the second stopper serving to attach or detach a unit to the pipe line, the opening in which is closed by the first stopper when the unit is detached.

5. In a milking machine, a member in a sigle piece forming a milk chamber having a valve seat therebelow with a shoulder for supporting a spring to hold a valve in position at the valve seat, there being an opening in the member at the upper portion of the milk chamber for the purpose specified.

In testimony whereof I have signed my name to this specification in the presence of the two subscribing witnesses.

MARVIN L. NORRIS.

Witnesses:
 PETER A. THOMPSON,
 LA VONE C. WILLIAMS.